Figure 2:
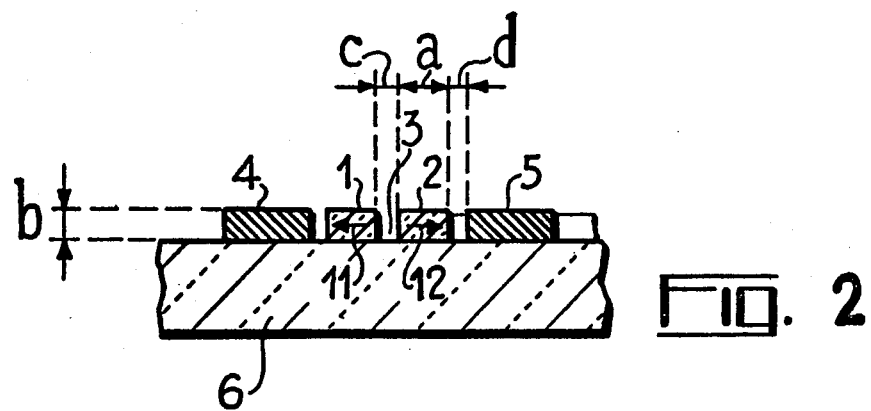

United States Patent [19]

Papuchon

[11] 4,077,113
[45] Mar. 7, 1978

[54] METHOD OF MANUFACTURING AN ELECTRO-OPTICAL SWITCH

[75] Inventor: Michel Papuchon, Paris, France
[73] Assignee: Thomson-CSF, Paris, France
[21] Appl. No.: 748,288
[22] Filed: Dec. 7, 1976

Related U.S. Application Data

[62] Division of Ser. No. 585,577, Jun. 10, 1975, Pat. No. 4,035,058.

[30] Foreign Application Priority Data

Jun. 14, 1974 France .................................. 74 20717

[51] Int. Cl.² ...................... H01P 11/00; H01Q 13/00
[52] U.S. Cl. .......................................... 29/600; 29/622
[58] Field of Search ........... 29/600, 622; 350/96 WG, 350/96 C

[56] References Cited

U.S. PATENT DOCUMENTS

| 3,208,342 | 9/1965 | Nethercot, Jr. | 350/96 WG |
|---|---|---|---|
| 3,813,142 | 5/1974 | Buhrer | 350/162 R X |
| 3,850,503 | 11/1974 | Riseberg et al. | 350/96 WG |
| 3,860,325 | 1/1975 | Matsushita | 350/96 WG |
| 3,883,220 | 5/1975 | Taylor | 350/96 C X |
| 3,909,108 | 9/1975 | Taylor | 350/96 WG |

OTHER PUBLICATIONS

"New Directional Coupler for Integrated Optics", Auracher et al., Journal of Applied Physics, vol. 45, No. 11, 11/1974, pp. 4997-4999.

*Primary Examiner*—Victor A. DiPalma
*Attorney, Agent, or Firm*—Cushman, Darby & Cushman

[57] ABSTRACT

A method of manufacturing an electro-optical switch in which a metal layer is deposited on a substrate of ferroelectric material and etched to expose the substrate in the form of two channels disposed parallel over a given length. A second layer is then deposited upon the metal layer and the channels, with the diffusion into the substrate of the second layer forming two zones having optical refractive indices greater than that of the substrate. The assembly is then heated and a biasing voltage applied to create remnant electrical polarizations in opposite senses. After removal of the bias voltage, the assembly is cooled and the metal layer removed.

3 Claims, 6 Drawing Figures

METHOD OF MANUFACTURING AN ELECTRO-OPTICAL SWITCH

This is a division, of application Ser. No. 585,577 filed June 10, 1975 now U.S. Pat. No. 4,035,058.

The present invention relates to an electrically controlled radiated energy switch, intended in particular for the field of integrated optical systems which are thus related to integrated electronic systems, i.e., monolithic structures which employ thin film techniques. The invention likewise relates to a method of manufacturing such a switch.

A switch of this kind can be built in accordance with the directional coupler principle, that is to say a device comprising two waveguides, the coupling between which is variable between 0 and 100% under the action of an external control arrangement. To this end, two radiated energy guides are disposed parallel to one another over a length referred to as the coupling length and defined in such a manner that the coupling is maximum, that is to say that the whole of the energy has been transmitted from one guide to the other at the end of the length L. If the guides or the material separating them are made of an electro-optical material, it is possible by an electrical control arrangement to vary one of the parameters defining the length L, for example the optical refractive index, so that the length L corresponds then to a situation of minimum coupling. Problems then arise associated with the effectiveness of control (the coupling must vary from 0 to 100% in order for the device to constitute a true switch) and with the magnitude of the electrical control powers which are required. In other words, when integrated optical systems are concerned these systems must be compatible with conventional integrated electronic circuits.

One result which the present invention seeks to secure, is the creation of a fast electro-optical switch, which can be controlled by relatively low-power electrical signals and is applicable to integrated electro-optical circuits.

According to the invention there is provided an electro-optical switch for conveying radiated energy from a first electro-optical guide to a second electro-optical guide wherein parts respectively of said first and second guides constituted by a ferro-electric material are arranged parallel with one another over a given length, known as the coupling length, at a distance from one another. The distance is adapted for causing the energy conveyance, and the parts of said first and second guides are polarized in a transverse direction and in opposite senses. The electro-optical switch further comprising control means for delivering a control signal and electrical inductive means controlled by said control signal for applying to said parts of guides and electric field parallel to the transverse direction, said electric field inducing opposite index changes in the parts of guides, with the conveyance of energy being induced and stopped according to said changes.

The invention likewise relates to a method of manufacturing this kind of switch.

Figure 1:
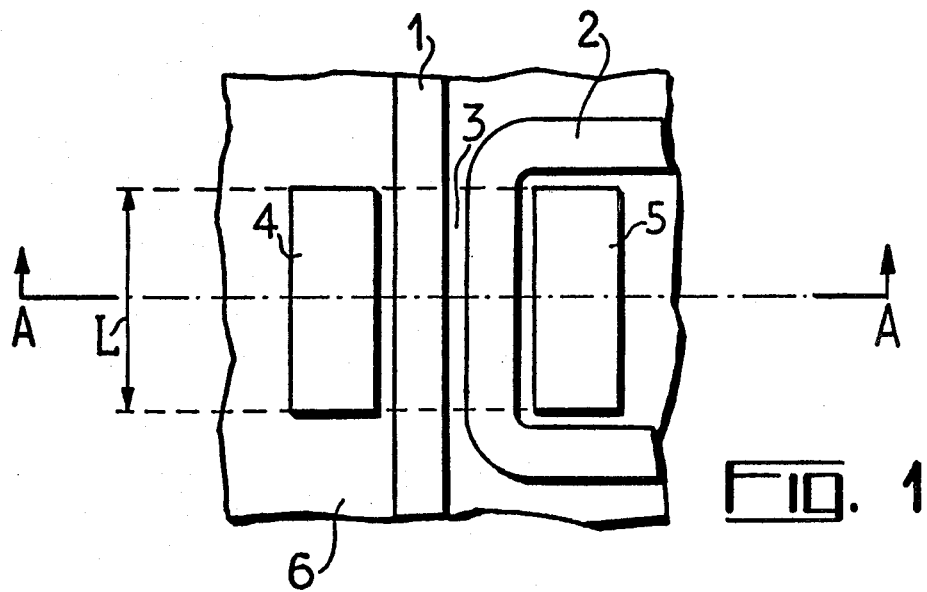

The invention will be better understood from a consideration of the ensuing description and the attached drawings in which:

FIG. 1 illustrates a plan view and

FIG. 2 a sectional view of an embodiment of the switch in accordance with the invention;

FIGS. 3, 4, 5 and 6 illustrate the different stages in the method of manufacture of the switch in accordance with the invention.

In these various figures, similar elements are designated by similar references.

In FIG. 1, part of the insulation substrate 6 has been shown carrying a switch in accordance with the invention, formed by two radiated energy parts of guides 1 and 2 and two metal electrodes 4 and 5, deposited upon the substrate 6. The guides 1 and 2 are mutually parallel over a length L referred to as the coupling length, the guide 2 diverging from the guide 1 in a substantially normal direction, at either end of the coupling length L. The guides will preferably have the same refractive index $n_1$, the same width $a$ and the same thickness $b$, and over the coupling length will be separated by a short interval $c$ equal to the order of magnitude of, or less than the width $a$, in order that coupling over the distance L shall be achieved with an efficiency of close to 100%, as explained in more detail hereinafter. The electrodes 4 and 5 are arranged over the coupling length L, to either side of the guides 1 and 2, the electrode 4 along the guide 1 and electrode 5 along the guide 2. These electrodes can either be separated from the guides by an interval $d$ as shown in FIG. 1, or instead may be in contact with the guides.

FIG. 2 is a sectional view taken along the axis AA of the device described hereinbefore, in which the substrate 6 on which the guides 1 and 2 of width $a$ and thickness $b$, and the electrodes 4 and 5, separated from the guides 1 and 2 by an interval $d$, are located.

The refractive index of the substrate 6 is $n_2$ and that of the medium 3, separating the two guides and constituted for example by air, is $n_3$.

In operation, it is well-known that when radiated energy propagates through a waveguide, for example the guide 1, and when a second guide 2 is arranged at sufficiently short interval, $c$, from the first, coupling takes place between the two guides through the agency of a phenomenon referred to as the evanescent wave phenomenon, such waves having an intensity which decreases extremely rapidly in the direction perpendicular to the walls of the guide. This coupling is at a maximum when the two guides are sufficiently close, namely in the order of some few wavelengths of the energy involved, and are identical, that is to say, have the same dimension ($a$ and $b$ in this case) and the same refractive index, $n_1$, so that total transfer of energy from one guide to the other takes place. It is thus possible to define a length L, known as the coupling length, in respect of which the whole of the energy supply to the first guide, 1, is transferred to the second, 2, and is maintained there if the two guides separate after the distance L in the manner shown in FIG. 1. The distance L depends upon the optical and geometric parameters of the structure and in particular upon the refractive indices $n_1$, $n_2$ and $n_3$.

To design an electro-optical switch, which will electrically control the transfer of energy from one guide to the other, the guides 1 and 2, are made of an electro-optical material, the refractive index $n_1$ of which can vary under the action of an electric field developed between the electrodes 4 and 5. More precisely, the guides 1 and 2 will be made of a ferro-electric material previously polarized in the same direction (that of the axis of section AA) but in opposite directions in the respective guides, as indicated by the arrows 11 and 12 in FIG. 2. The application of a potential difference between the electrodes 4 and 5, for example "+" to 4 and "−"to 5, brings about a variation $\Delta n_1$ in the refractive index $n_1$ of the material. The variation is $-\Delta n_1$ in the case of the guide 1 and $+\Delta n_1$ in the case of the guide 2. The different parameters are chosen so that the asymmetry thus introduced between the two guides produces, in respect of the length L, a minimum coupling which is virtually zero.

Thus, a device has been created which either does or does not switch the whole of the radiated energy from one of the guides to the other, depending upon whether or not an electrical control signal is applied to it.

The reverse mode of operation is of course entirely possible. It is merely necessary to choose a length L corresponding to a minimum coupling factor in the absence of any electric field.

It should be pointed out that the electrical control voltages involved by this device are small, of the order of some few volts only and are entirely compatible with the amplitudes put out by the integrated electronic circuits.

In addition, electrodes 4 and 5 can be arranged at a distance d from the guides in order to prevent losses due to metallic absorption of the radiated energy when reflected at the guide-electrode interface. This distance need not be accurately determined and need not even be completely constant over the whole of the length L. Finally, in the embodiment described in FIGS. 1 and 2, the material 3 located between the guides is constituted by air.

In the preferred embodiment described hereinafter, it is constituted by the substrate.

Figure 3:
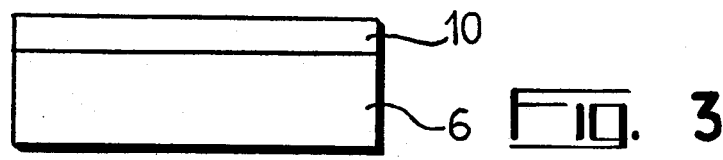

FIG. 3 illustrates the first stage in the method of the invention. It illustrates the substrate 6 of refractive index $n_2$, constituted by the ferro-electric material lithium tantanate, covered with a layer 10 of metal, such as for example, platinum.

Figure 4:
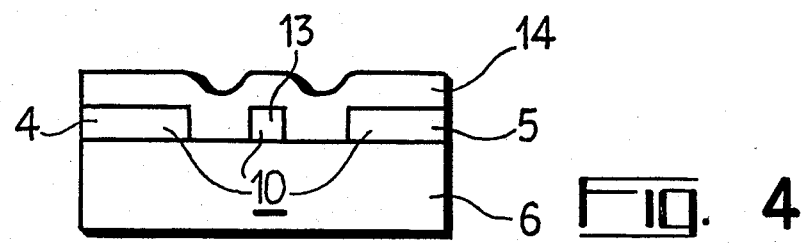

FIG. 4 illustrates the substrate 6 and the layer 10 cut to form three electrodes, i.e., the electrodes 4 and 5 and a central electrode 13. The cutting can be performed by any of the masking techniques conventionally employed in integrated circuits. On the assembly there is deposited a layer 14 of niobium which is diffused into those zones of the substrate 6, of channel form, which are exposed by the layer 10.

Figure 5:
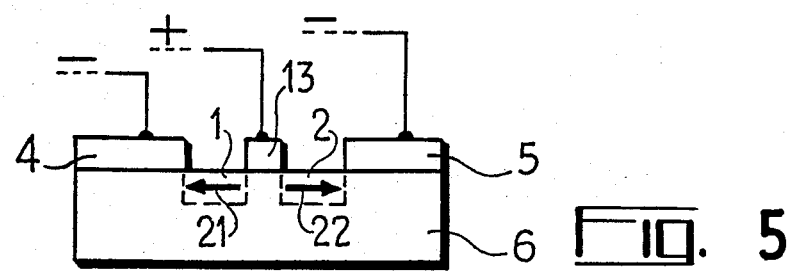

After diffusion and possibly cleaning of the niobium covering the electrodes 4, 13 and 5, two zones are obtained containing niobium and consequently having a refractive index $n_1$, which is higher than that $n_2$ of the substrate, these zones constituting the guides 1 and 2 as FIG. 5 shows. The assembly is heated to beyond the Curie temperature of the material, in this case in the order of 1100° C, whereafter, between the electrodes two electric fields are applied in the manner indicated in FIG. 5 by the arrows 21 and 22, the fields having the same amplitude and the same direction but opposite senses. Finally, the assembly is slowly cooled in order to polarize the guides 1 and 2, in the manner described earlier.

Figure 6:
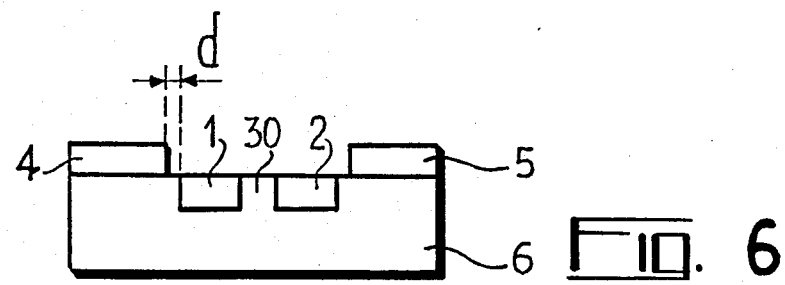

In a final stage, shown in FIG. 6, the central electrode 13 is discarded, its presence being in particular responsible for the occurence of losses due to metallic absorption, and the electrodes 4 and 5 spaced away from the guides 1 and 2 by the distance d. As described earlier on, this latter operation, which can also be carried out using conventional masking techniques, does not require the same order of accuracy as the preceding operations.

In this fashion, the switch in accordance with the invention has been produced, the switch being constituted by the two radiated energy guides 1 and 2 and the two electrodes 4 and 5, the two guides in this embodiment being separated by the thickness of the substrate marked 30.

One advantage of this method, in particular, is that it makes it possible to utilise the same operation in manufacturing the electrodes 4 and 5 and in masking the substrate for purposes of diffusion.

By way of non-limitative example, the switch of the present invention has been manufactured using guides of width a in the order of 5 microns, parallel with one another over a distance L and separated by a distance c of around 2 microns, the control voltage being less than 5 volts.

What I claim is:

1. A method of manufacturing an electro-optical switch, wherein it comprises the following stages:
   the deposition of a metal layer on a substrate of ferroelectric material;
   the etching of said metal layer in order to expose the substrate in the form of two channels disposed parallel to over a given length, known as the coupling length, said channels being separated by a metal median band and hugged by metal side bands;
   the deposition upon said metal layer and upon said channels, for purposes of diffusion, of a second layer of one material, and the diffusion into the substrate opposite said channels, of said second layer itself, thus forming two zones having optical refractive indices greater than that of the substrate, which zone constituted two radiated energy guides;
   the creating of remanent electric polarizations in opposite senses in said zones by heating the assembly to beyond the Curie temperature and by applying a biasing voltage between said median band and said two side band;
   the cooling of the assembly followed by the cancelling of the bias voltage;
   the removal of said metal layer with the exception of two areas constituting two electrodes at either side of the guides, over the length L.

2. A method as claimed in claim 1, wherein said substrate is constituted by lithium tantanate.

3. A method as claimed in claim 2, wherein said second layer is constituted by niobium.

* * * * *